(12) United States Patent
Komiya

(10) Patent No.: US 7,280,237 B2
(45) Date of Patent: Oct. 9, 2007

(54) IMAGE PROCESSING SYSTEM, INFORMATION PROCESSING APPARATUS, CONTROL METHOD OF THE INFORMATION PROCESSING APPARATUS, AND STORAGE MEDIUM FOR STORING PROGRAM FOR IMPLEMENTING THE CONTROL METHOD

(75) Inventor: Yoshiyuki Komiya, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 883 days.

(21) Appl. No.: 10/173,590

(22) Filed: Jun. 19, 2002

(65) Prior Publication Data

US 2002/0196452 A1 Dec. 26, 2002

(30) Foreign Application Priority Data

Jun. 25, 2001 (JP) ............................. 2001-191454

(51) Int. Cl.
*G06F 15/00* (2006.01)
*G06Q 30/00* (2006.01)
(52) U.S. Cl. ........................................ 358/1.13; 705/26
(58) Field of Classification Search .................. 358/1.2, 358/1.15, 468, 518, 1.13, 1.1, 442, 402, 1.11, 358/537; 705/26–27, 51, 64; 715/764, 500; 370/395.21; 382/170; 707/1, 10
See application file for complete search history.

(56) References Cited

U.S. PATENT DOCUMENTS

| | | | | |
|---|---|---|---|---|
| 5,903,716 A | * | 5/1999 | Kimber et al. | 358/1.13 |
| 2002/0186402 A1 | * | 12/2002 | Jackson et al. | 358/1.15 |
| 2003/0053141 A1 | * | 3/2003 | Whisnant et al. | 358/402 |
| 2005/0264832 A1 | * | 12/2005 | Baum et al. | 358/1.2 |

\* cited by examiner

*Primary Examiner*—David Moore
*Assistant Examiner*—Saeid Ebrahimi
(74) *Attorney, Agent, or Firm*—Fitzpatrick, Cella, Harper & Scinto

(57) ABSTRACT

An information processing apparatus receives image data and an output condition. The information processing apparatus combines additional data to the received data and enables a first output device to perform the test printing based on the output condition. After the user checks the result of the test printing, the information processing apparatus enables a second image output device to perform the actual printing of the image data based on the output condition. A charge for the test printing is accounted in accordance with the combined additional information.

20 Claims, 14 Drawing Sheets

FIG. 4

| (1) CHECK AT START OF PRINTER | (2) CHECK EVERY PREDETERMINED PERIOD |
|---|---|
| TYPE OF PRINTER<br>SHEET STORAGE SIZE<br>RESOLUTION<br>MONOCHROME / COLOR<br>PRINTING SPEED<br>PHYSICAL POSITION OF PRINTER<br>PRINTER LANGUAGE<br>PRINTER FONT<br>STAPLE FUNCTION<br>PUNCH FUNCTION<br>BINDING FUNCTION<br>Nin1 FUNCTION<br>DOUBLE-SIDE FUNCTION | PRINTER STATUS<br>REMAINING SHEET<br>REMAINING TONER<br>REMAINING MEMORY<br>REMAINING STAPLE |

FIG. 5

| NO. | USER ID | IMAGE ID | JOB ID | PROPERTY INFORMATION | RECEPTION TIME | OUTPUT TIME |
|---|---|---|---|---|---|---|
| 1 | 12345 | 0001 | 000001 | A4 / 5 SHEETS / 5 COPIES / COLOR | 2000/9/26 11:55 | 2000/10/6 19:00 |
| 2 | 23456 | 0002 | 000002 | A4 / 3 SHEETS / 1 COPY / COLOR | 2000/9/26 14:00 | 2000/9/28 15:00 |
| 3 | 12345 | 0003 | 000003 | A4 / 22 SHEETS / 1 COPY / MIXED | 2000/9/27 10:11 | 2000/9/27 15:00 |
| 4 | 77777 | 0004 | 000004 | POST CARD / 1 SHEET / 15 COPIES / COLOR | 2000/9/27 11:00 | 2000/9/28 12:30 |
| 5 | 12111 | 0005 | 000005 | A3 / 3 SHEETS / 3 COPIES / MONOCHROME | 2000/9/28 18:00 | 2000/9/29 8:30 |

FIG. 6

| AREA | CONTENTS | RATIO OF ADVERTISER'S CHARGE | CATEGORY |
|---|---|---|---|
| A4 · 1/8 | HOUSING INFORMATION | 5% | REGION A |
| | EVENT INFORMATION | 3% | CUSTOMER B |
| | ⋮ | ⋮ | ⋮ |
| | SUPERMARKET ○× STORE | 3% | REGION C |
| | ⋮ | ⋮ | ⋮ |
| A4 · 1/4 | JOB INFORMATION | 1% | REGION A |
| | ○× ELECTRIC APPLIANCE ×× STORE | 5% | REGION B |
| | | | |
| | | | |
| | | | |
| | ⋮ | ⋮ | ⋮ |
| | ⋮ | ⋮ | ⋮ |
| | ⋮ | ⋮ | ⋮ |
| | | | |
| A4 / REAR | EVENT INFORMATION | 10% | CUSTOMER C |
| | ○○ USER CAR | 5% | REGION B |
| | ⋮ | ⋮ | ⋮ |
| | ⋮ | ⋮ | ⋮ |
| | | | |
| | | | |
| | ⋮ | ⋮ | ⋮ |
| | ⋮ | ⋮ | ⋮ |
| | ⋮ | ⋮ | ⋮ |

FIG. 7

| NUMBER OF PAGES | PER PAGE | 1 YEN |
|---|---|---|
| NUMBER OF COPIES | PER COPY | 2 YEN |
| SIZE OF OUTPUT SHEET | A4 | 2 YEN |
|  | ⋮ | ⋮ |
|  | POST CARD | 50 YEN |
| TYPE OF OUTPUT SHEET | PLAIN SHEET | 2 YEN |
|  | CARDBOARD | 3 YEN |
|  | GLOSSY SHEET | 4 YEN |
| PAGE LAYOUT | SINGLE SIDE | 4 YEN |
|  | ⋮ | ⋮ |
|  | 4 PAGES / SHEET | 1 YEN |
| COLOR / MONOCHROME | MONOCHROME | 5 YEN |
|  | FULL COLOR | 10 YEN |
|  | ⋮ | ⋮ |
| RESOLUTION | 200 dpi | 1 YEN |
|  | 400 dpi | 2 YEN |
|  | ⋮ | ⋮ |
| FINISHING | CASE BINDING | 100 YEN |
|  | SADDLE STITCH | 50 YEN |
|  | ⋮ | ⋮ |
|  | PUNCH | 30 YEN |
| OUTPUT DATE OF TEST | 8:00~17:00 | 50 YEN |
|  | 17:00~22:00 | 100 YEN |
| OUTPUT PLACE OF TEST PRINTING | A BRANCH OFFICE | 30 YEN |
|  | B BRANCH OFFICE | 80 YEN |
| OUTPUT DATE OF ACTUAL | 8:00~17:00 | 100 YEN |
|  | 17:00~22:00 | 150 YEN |
| OUTPUT PLACE OF ACTUAL PRINTING | C SALES OFFICE | 500 YEN |
|  | D SALES OFFICE | 200 YEN |

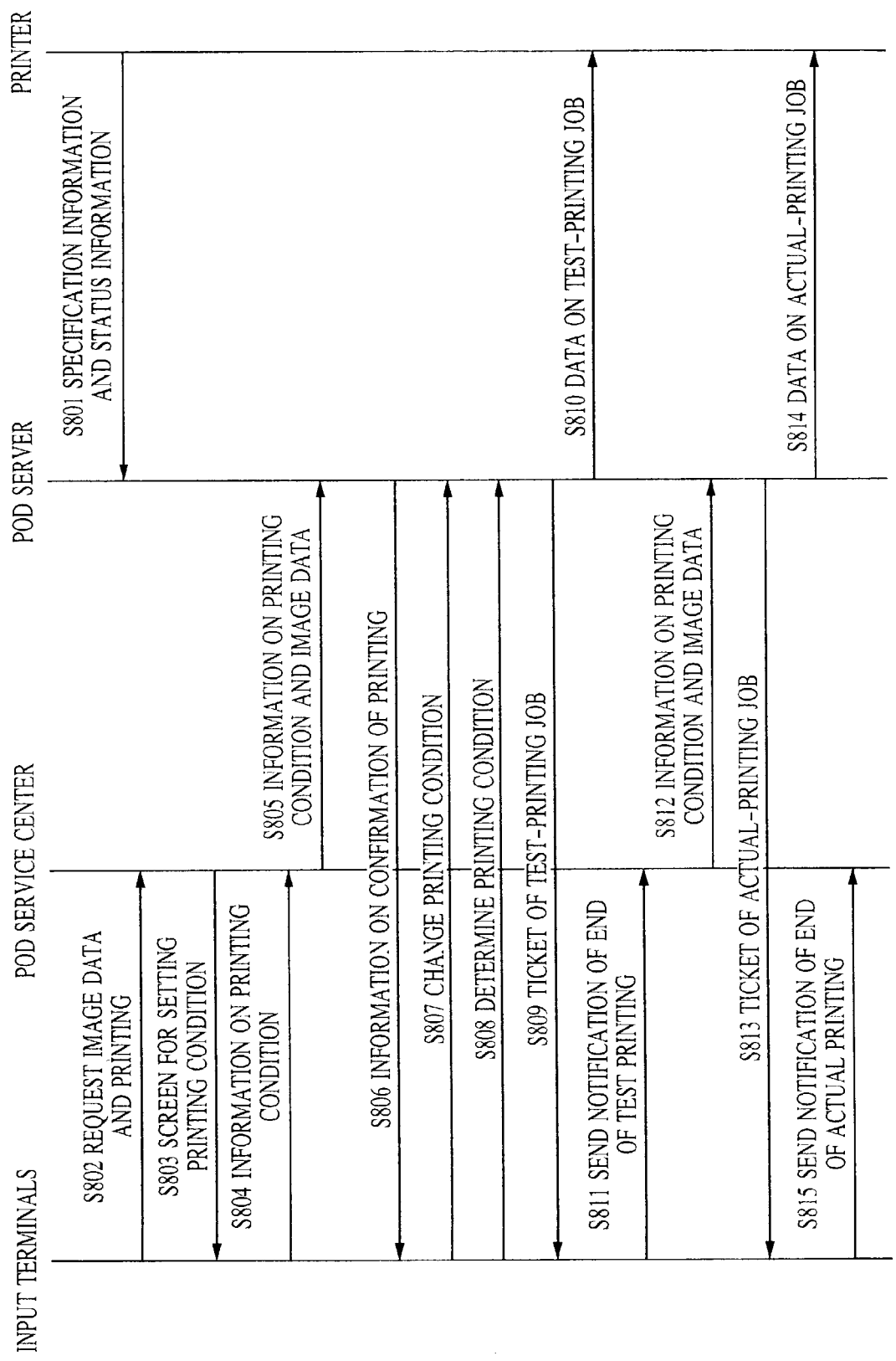

FIG. 10

```
IMAGE ID              : 0003      USER ID : a123
NUMBER OF PAGES       : 13 PAGES
NUMBER OF COPIES      : 5 COPIES
OUTPUT SHEET SIZE     : ●A4  ○A3  ○B4  ○B5  ○POST CARD
TYPE OF OUTPUT SHEET  : ●PLAIN SHEET  ○CARDBOARD  ○GLOSSY SHEET
PAGE LAYOUT           : ●SINGLE SIDE  ○DOUBLE SIDE
                        ●2 PAGES / SHEET  ○4 PAGES / SHEET
COLOR / MONOCHROME    : ○MONOCHROME  ●FULL COLOR  ○THREE-COLOR
                        ○MIXED
RESOLUTION            : ○200 dpi  ○400 dpi  ●600 dpi  ○1200 dpi
FINISHING             : ○CASE       ○SADDLE     ○FOLIO     ○Z-SHAPED
                         BINDING     STITCH                 FOLDING
```

●STAPLE    ○TWO-STAPLE    ○PUNCH

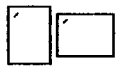
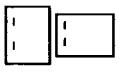

```
TEST PRINTING              : ●YES (WITH ADVERTISEMENT)  ○YES (WITHOUT ADVERTISEMENT)
                             ○NO
OUTPUT PLACE OF TEST PRINTING   : [PRINT SHOP 111 ▼]
OUTPUT DATE OF TEST PRINTING    : 16:00, OCTOBER 6, 2001
OUTPUT PLACE OF ACTUAL PRINTING : [PRINT SHOP 113 ▼]
OUTPUT DATE OF ACTUAL PRINTING  : 9:30, OCTOBER 20, 2001
```

[ RESET ]   [ SEND ]

FIG. 11

```
IMAGE ID : 0001
NUMBER OF ORIGINALS : 5
FINISHING SIZE : A4
OUTPUT SHEET : STANDARD
FINISHING : STAPLE
RESOLUTION : 600 dpi
OUTPUT DATE : 19:00, OCTOBER 6, 2000
OUTPUT PLACE : CANON PRINT SHOP SHIMO-MARUKO
AMOUNT OF MONEY : 1600 YEN (ACTUAL PRINTING) / 300 YEN
                              (TEST PRINTING)
```

1101 — PRINT :              ○ YES    ○ NO
1102 — CHANGE OF JOB : ○ YES    ○ NO

IMAGE PROCESSING SYSTEM, INFORMATION PROCESSING APPARATUS, CONTROL METHOD OF THE INFORMATION PROCESSING APPARATUS, AND STORAGE MEDIUM FOR STORING PROGRAM FOR IMPLEMENTING THE CONTROL METHOD

BACKGROUND OF THE INVENTION

1. Field of the Invention

The present invention relates to a printing service system for printing image data by using a printing device, such as a copy machine or a printer, connected to a network, a printing service method and apparatus, a control method of the printing service apparatus, and a storage medium for storing a program for implementing the control method.

2. Description of the Related Art

Recently, a variation in user's needs has caused an enlargement of market demand for so-called Print On Demand (hereinafter, referred to as a POD) for printing a user's required number of copies of a printing matter, in his desired printing format, to his required place, when necessary.

Furthermore, the widespread use of a communication infra-structure, such as the Internet or an Intranet, advances the capabilities in a network for printing devices such as a digital copy machine, a printer, and a facsimile. In addition, the widespread use of storage media having a large capacity, such as a hard disk, facilitates the distribution and the storage of image data. A user connects a notebook-type personal computer to a web site or his home personal computer via a public telephone or a cellular phone, thereby freely obtaining, transferring, or processing data from the outside.

Under the above-mentioned conditions, a POD service has been proposed for use at print shops. In this case, the user does not go directly to the print shop, but instead, uses his home personal computer to access a home page of the print shop via a network such as the Internet. Then, the user can order printing, input or change order contents, and check a printing job status. The print shop outputs a printing matter in accordance with the order contents from the user and prints it by using a printing device such as a digital copy machine or a printer connected to a network, and finishes the job utilizing, for example, finishing equipment for binding. Incidentally, original data such as the desired output destination of the printing matter (print shop), the number of copies, and an output format (binding, staple, the presence or absence of a test printing, and so on) are input as order contents. Further, individual user information is input.

In the above-described POD service, the user performs a test printing so as to check the finishing before printing a numerous number of copies. When a printing matter having user's desired design and color is not obtained as the result of the test printing, the user must repeatedly perform the test printing. Consequently, there is problem in that a printing charge for the test printing is increased, it exceeds his budget, and user's load is increased.

Further, in another conventional printing service system, when an original is printed, an advertisement image is combined to a margin of an original image and a printing matter is outputted, a charge for the printing matter is paid by a presenter of the advertisement image. However, upon printing the original, the insertion of the advertisement is not desired depending on a user.

SUMMARY OF THE INVENTION

Accordingly, it is one object of the present invention to reduce costs for a test printing when a user performs the test printing and checks the finishing before an actual printing according to a first embodiment of the present invention.

Further, it is another object of the present invention to enable a test printing at a convenient place for a user, which is different from a printing place for an actual printing.

According to a first aspect of the present invention, there is provided an image processing system for outputting image data based on a designated output condition, comprising: combining means for combining additional data to the image data; a first image processing device for outputting the image data combined by the combining means based on the output condition; and a second image processing device for outputting the image data based on the output condition after outputting the image data by the first image processing device.

According to a second aspect of the present invention, there is provided an information processing apparatus, comprising: detecting means for detecting an output condition to output image data; and transmitting means for transmitting the image data and the output condition, wherein the transmitting means transmits the image data and the output condition to a destination designated by the detected output condition so as to generate first job data for outputting combined image data obtained by combining additional data to the image data in accordance with the output condition detected by the detecting means, based on the output condition, or so as to generate second job data for outputting the image data based on the output condition.

According to a third aspect of the present invention, there is provided a control method of an information processing apparatus, comprising the steps of: detecting an output condition for outputting image data; and transmitting the image data and the output condition, wherein the transmission is performed to a destination which is designated under the detected output condition so as to generate first job data for outputting combined image data obtained by combining additional data to the image data in accordance with the output condition detected in the detecting step or so as to generate second job data for outputting the image data based on the output condition.

According to a fourth aspect of the present invention, there is provided a computer-readable storage medium for storing a program for implementing a control method of an information processing apparatus communicable with a plurality of image output devices, wherein the program comprises the steps of: detecting an output condition for outputting image data; and transmitting the image data and the output condition, wherein the transmission is performed to a destination which is designated under the detected output condition so as to generate first job data for outputting combined image data obtained by combining additional data to the image data in accordance with the output condition detected in the detecting step or so as to generate second job data for outputting the image data based on the output condition.

According to a fifth aspect of the present invention, there is provided a method of printing over a network, comprising the steps of: a service center receiving a printing request from a user terminal; the service center transmitting information to the user terminal for inputting of printing options; the service center receiving, from the user terminal, the input printing options; the service center transmitting confirmation information to the user terminal for confirmation of the printing options; the service center receiving confirmation of the printing options from the user terminal, and in response thereto, transmitting print data and the printing options to a print provider; and the print provider printing the print data with additional data based on the printing options, thereafter, printing the print data without the additional data based on the printing options, and providing a completed print job to a receiving party.

According to a sixth aspect of the present invention, there is provided a server terminal for printing service provider, comprising: a processor that executes computer-executable process steps; and a memory that stores the computer-executable process steps, wherein the computer-executable process steps comprise the steps of (a) receiving a printing request from a user terminal, (b) in response to the received printing request, transmitting information to the user terminal for inputting of printing options, (c) receiving, from the user terminal, the input printing options, (d) transmitting confirmation information to the user terminal for confirmation of the printing options, (e) receiving confirmation of the printing options from the user terminal, (f) in response to receiving the confirmation, transmitting print data and the printing options to a print provider, (g) printing the print data with additional data based on the printing options, (h) thereafter, printing the print data without the additional data based on the printing options, and (i) providing a completed print job to a receiving party.

According to a seventh aspect of the present invention, there is provided computer-executable process steps for printing over a network, comprising the steps of: a service center receiving a printing request from a user terminal; the service center transmitting information to the user terminal for inputting of printing options; the service center receiving, from the user terminal, the input printing options; the service center transmitting confirmation information to the user terminal for confirmation of the printing options; the service center receiving confirmation of the printing options from the user terminal, and in response thereto, transmitting print data and the printing options to a print provider; and the print provider printing the print data with additional data based on the printing options, thereafter, printing the print data without the additional data based on the printing options, and providing a completed print job to a receiving party According to an eighth aspect of the present invention, there is provided a computer-readable medium on which are stored computer-executable process steps for printing over a network, the computer executable process steps comprising the steps of; a service center receiving a printing request from a user terminal; the service center transmitting information to the user terminal for inputting of printing options; the service center receiving, from the user terminal, the input printing options; the service center transmitting confirmation information to the user terminal for confirmation of the printing options; the service center receiving confirmation of the printing options from the user terminal, and in response thereto, transmitting print data and the printing options to a print provider; and the print provider printing the print data with additional data based on the printing options, thereafter, printing the print data without the additional data based on the printing options, and providing a completed print job to a receiving party.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram showing specification information and status information of a printer.

FIG. 5 is a diagram showing a job history.

FIG. 6 is a diagram showing a table for storing information on advertisement data.

FIG. 7 is a diagram showing a table for storing information on printing charges.

FIG. 8 is a sequence diagram for explaining the operation of the printing service system.

FIG. 10 is a diagram showing a screen for setting a printing condition.

FIG. 11 is a diagram showing a screen for checking the printing.

DESCRIPTION OF THE PREFERRED EMBODIMENTS

First Embodiment

Hereinbelow, a detailed description is provided for a printing service system according to a first embodiment of the present invention.

Figure 1:
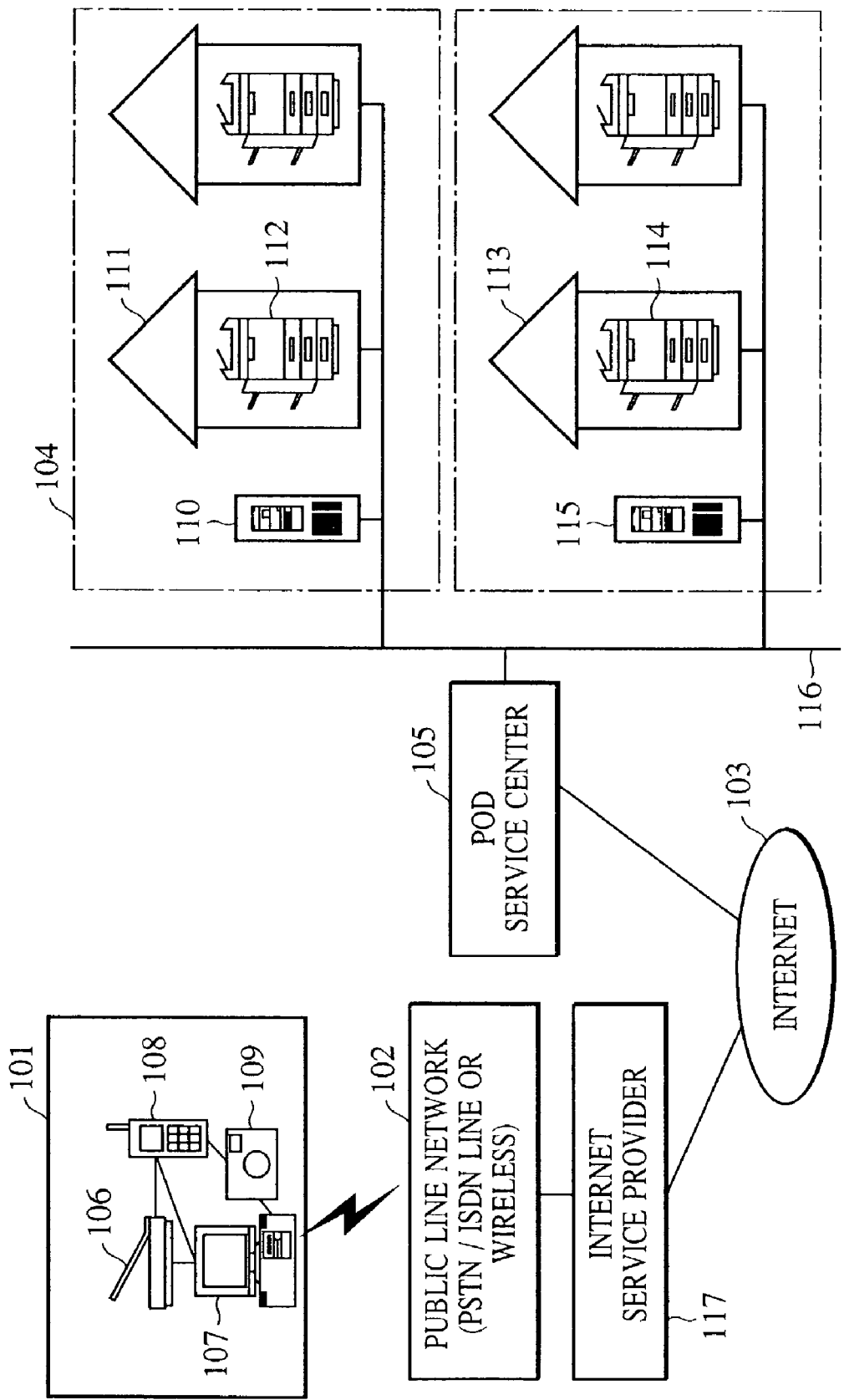
FIG. 1 is a schematic diagram showing a printing service system.

FIG. 1 is a diagram showing the printing service system according to the first embodiment. Reference numeral 101 denotes an input terminal group arranged at an office or a home of a user who orders a printing service. The input terminal group 101 comprises a scanner 106, a personal computer (PC) 107, a portable communication terminal 108, and a digital camera 109, which are connected by a network such as a LAN (Local Area Network). The input terminal group 101 forms image data by reading an original by the scanner 106, photographing an image by the digital camera 109, or forming an image by using application software in the PC 107. Alternatively, the input terminal group 101 forms image data by transmitting the image formed by the scanner 106 or the digital camera 109 to the PC 107 and editing and combining the transmitted image on the PC 107 by using application software. Incidentally, the image obtained by the scanner 106 or the digital camera 109 may be transmitted to the PC 107 via the portable communication terminal 108 or by a radio transmission.

Reference numeral 102 denotes a wire or wireless public line network such as a PSTN (Public Switched Telephone Network) or ISDN (Integrated Service Digital Network). Reference numeral 103 denotes the Internet which may be accessed via the network 102 on an Internet service provider 117.

Reference numeral 104 denotes an output device group on a printing service presenter side. The output device group 104 comprises POD servers 110 and 115, and printers 112 and 114 arranged at print shops 111 and 113. The POD servers 110 and 115 and the printers 112 and 114 are connected to a LAN 116. Printers 112 and 114 correspond to image forming devices such as a digital copy machine, a facsimile, an ink-jet printer, a laser beam printer, or a digital hybrid machine having a plurality of the above-mentioned functions.

Reference numeral 105 denotes a POD service center on a printing service presenter side having a PC (not shown) for managing a printing request and a printing charge from the output device group 104 and the input terminal group 101.

The image data formed by the input terminal group 101 is stored in the POD server 110 or 115 in the output device group 104 via the public line 102 and the Internet 103. Further, the image data is controlled so that the image data stored in the POD server 110 or 115 is printed at a user's designated time by the printer 112 or 114 at the user's designated print shop 111 or 113.

Figure 2:
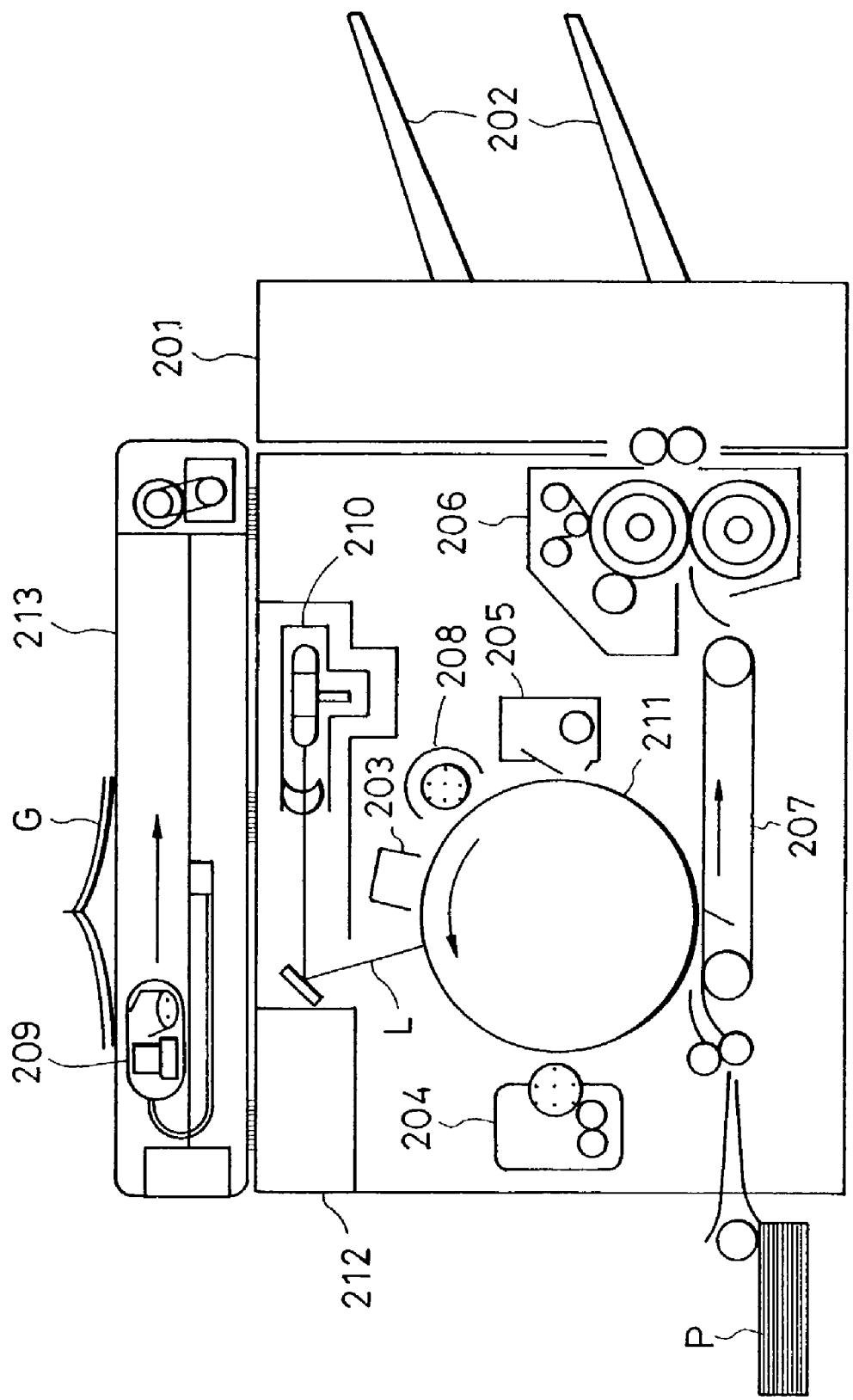
FIG. 2 is a cross-sectional view of a printer.

A description will now be given of the printers 112 and 114 with reference to FIG. 2. FIG. 2 shows a cross-sectional view of the printer 112. Although the printer 112 is described hereinafter for facilitating the description, the printer 114 is similar to the printer 112. According to the first embodiment, the printer 112 corresponds to a digital hybrid machine having a plurality of functions such as a copy machine, a printer, a facsimile, etc.

The printer 112 comprises an image forming section 212 and a finishing section 201. A start key (not shown) of the image forming section 212 is pressed and then a photosensitive drum 211 is charged by a charger 203 so as to have a predetermined potential. An integral unit 209 comprises a lamp for irradiating an original (not shown), a short-focusing lens array (not shown), and a CCD sensor (not shown). By irradiating and scanning an original G on an original plate 213 by using the integral unit 209, reflection light of irradiation and scanning light on an original surface forms an image through the short-focusing lens array and is then incident oh the CCD sensor. The CCD sensor comprises a CCD light receiving unit (not shown), a transfer unit (not shown), and an output unit (not shown). The CCD light receiving unit converts a light signal into a charge signal. The transfer unit sequentially transfers the charge signals synchronously with clock pulses. The output unit converts the charge signal into a voltage signal, amplifies the charge signal, forms the charge signal with a low impedance, and outputs it. An obtained analog signal is subjected to well-known image processing, is converted into a digital signal, and is transmitted to the image forming section 212.

In the image forming section 212, a latent image corresponding to an original image is formed on a photosensitive drum 211 by laser exposing means 210 for scanning an image by a rotary polygon mirror for rotating at a high speed, light transmitted from a solid laser element, which is turned on or off in response to an image signal. Next, a developer 204 accommodates a two-component developing agent having toner particles and carrier particles. The developer 204 develops the latent image and a toner image is obtained on the photosensitive drum 211. The toner image formed on the photosensitive drum 211 is statically transferred on a transfer material P by a transfer device 207. Thereafter, the transfer material P is statically separated and is conveyed to a fixer 206. Then, it is thermally fixed and is exhausted to the finisher 201. The finisher 201 performs processing such as stapling (one or two staples), punching (two punches or three punches), or binding and saddle stitch.

A sheet discharge tray 202 comprises a plurality of trays that separately receive discharged sheets depending on functions of copying, printing, facsimile, etc. or discharged sheets sorted for a plurality of copies.

When data is printed by using the printer function of the printer 112, the user can set monochrome/color printing, sheet size, N pages/one-page printing, double-sided printing, stapling, punching, binding and saddle stitch, slip sheet, cover sheet, back cover, etc. by using a printer driver.

Figure 3:
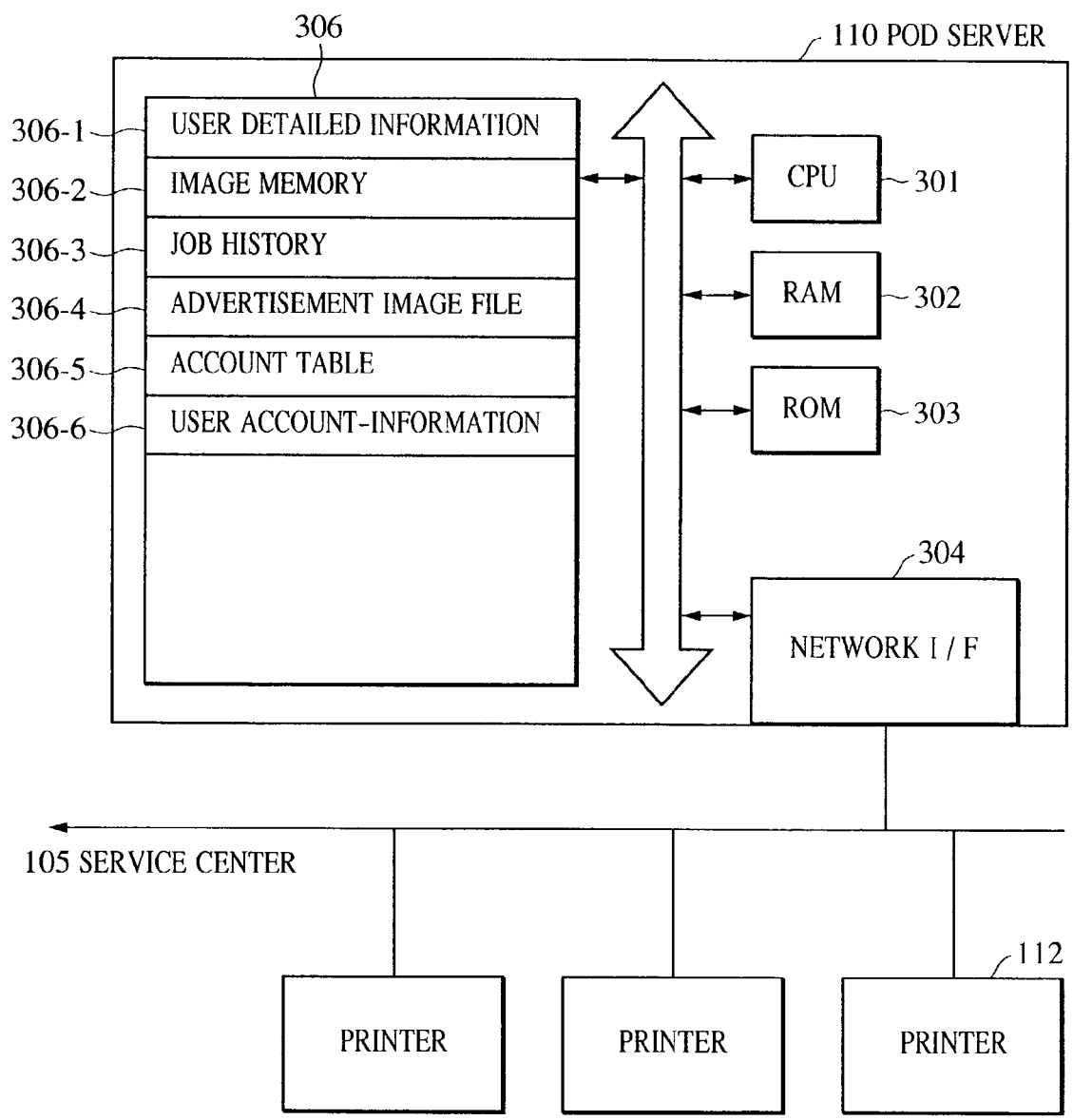
FIG. 3 is a conceptual diagram of a POD server.

The output device group 104 will be described with reference to a block diagram of FIG. 3. The output device group 104 includes the POD servers 110 and 115, and the printers 112 and 114 provided for the print shops 111 and 113. The POD servers 110 and 115 and the printers 112 and 114 are connected to the LAN 116. Although the POD server 110, the print shop 111, and the printer 112 will be described hereinbelow for the sake of a brief description, the POD server 115, the print shop 113, and the printer 114 are respectively the same as those described.

The POD server 110 comprises a CPU 301, a RAM 302, a ROM 303, a hard disk 306, and a network interface (I/F) 304. The POD server 110 functions as a print server for storing a printing job and managing specification information and status information of the printer 112, in addition to serving as the image server for storing the image data. The specification information relates to information on the function of the printer 112, the status information relates to information on a using situation, a job, and an available status of the printer 112.

A power source of the POD server 110 is turned on, whereby the POD server 110 obtains the specification information indicated in "(1) Check information upon starting the printer", and stores the obtained information in the RAM 302. A power source of the printer 112 is turned on, whereby the printer sends a notification indicating "(1) Check information upon starting the printer" to the POD server 110 (see FIG. 4).

After the power sources of the POD server 110 and the printer 112 are turned on, the POD server 110 receives the status information of the printer 112 indicated in "(2) Check information every predetermined period" in FIG. 4, from the printer 112 via the network I/F 304, and stores the received information in the RAM 302. There are known methods for receiving the status information such as a method for polling data to the printer 112 from the POD server 110 and a method for transmitting the status information to the POD server 110 from the printer 112. The status information is received at arbitrarily set times, or upon requesting printing by the user or execution of the printing.

The hard disk 306 in the POD server 110 stores various software providing functionality for the server for storing the image data or for functioning as the print server. Further, the hard disk 306 stores various information necessary for the printing service system. For example, user detailed information 306-1 stores individual user information which has been registered so that the user can use the present printing service. An example of user information may be an address, telephone number, age, sex, bank account number for payment, and credit number as well as a user ID. An image memory 306-2 stores the image data whose printing is requested by the user, the image data being associated with an image ID and the user ID.

A job history 306-3 stores information on the output of the image data. The information may be stored as a table as shown in FIG. 5. Referring to FIG. 5, the table stores the user ID, an image ID, a job ID, property information of a printing matter, a reception time, and an output time.

An advertisement image file 306-4 stores advertisement data which is inserted in a margin of a printing sheet on which the image data is printed upon a test printing. Referring to FIG. 6, the advertisement data is classified depending on an area or contents of the margin, the ratio of a charge for an advertisement provider, a category, and the like. Incidentally, since the advertisement provider pays a printing charge in accordance with the printed advertisement size, the number of printing copies, and the number of printing sheets, the user may pay a charge obtained by subtracting an advertisement charge paid by the advertisement provider from the normal printing charge.

An account table 306-5 stores information on the printing charge, such as a table shown in FIG. 7. The POD server 110 calculates the printing charge of the test printing or the actual printing based on the account table 306-5. In the account table 306-5 shown in FIG. 7, there are set charges for items of: the number of output pages per copy; the number of output copies; output sheet size; the type of output sheet; page layout, color/monochrome; resolution; finishing; output date of the test printing; output place of the test printing; output date of the actual printing; and output place of the actual printing.

User account information 306-6 stores the user ID, the printing charges and output dates for the test printing and the actual printing, and the account information of the used printer 112 or 114. The stored account information is used when the printing charge is accounted to the user, and is used for calculating the sales amount per printer. The calculation of the sale amount is performed, for example, every month.

Figure 9:
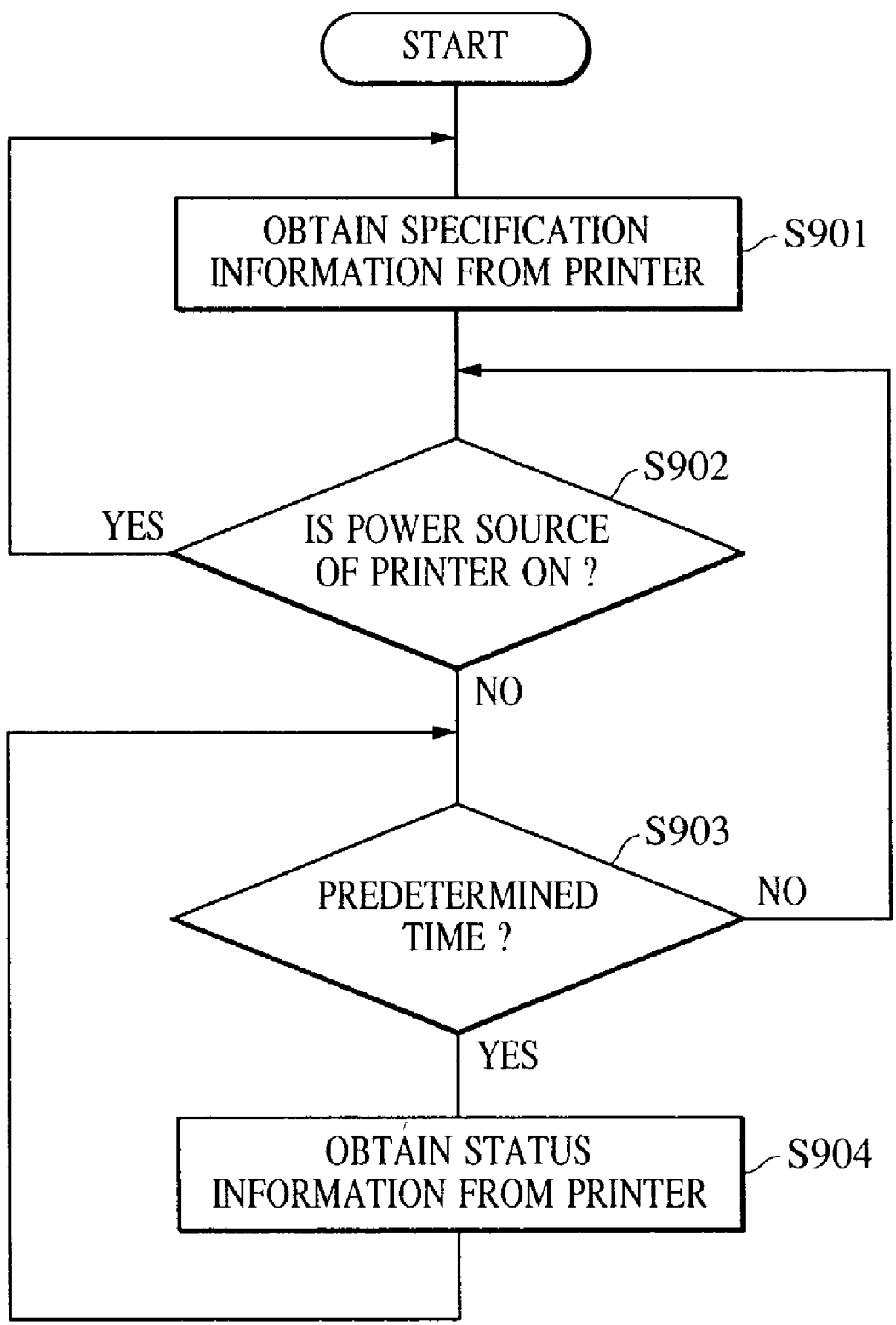
FIG. 9 is a flowchart for explaining the operation of the POD server.

FIG. 8 is a conceptual diagram showing the operation sequence of the printing service system according to the first embodiment. In step S801, the POD servers 110 and 115 check the specification information and the status information shown in FIG. 4 of the printers 112 and 114, managed as the printing servers. A description will now be given of the operation sequence in which the POD servers 110 and 115 obtain the specification information and the status information of the printers 112 and 114 according to the first embodiment with reference to the flowchart of FIG. 9.

In step S901, a power source of the POD server 110 is turned on and, then, the POD server 110 obtains the specification information of an item indicated in "(1) Check information upon starting the printer" in FIG. 4 from the printer whose power source is turned on, and stores the obtained specification information in the RAM 302.

In step S902, the POD server 110 checks to see if there is a printer whose power source newly turned on. After checking for the turned-on printer, in step S901, the POD server 110 obtains the specification information of the item indicated in "(1) Check upon starting the printer" in FIG. 4 from the printer, and stores the obtained information in the RAM 302.

In step S903, the POD server 110 checks to see if a predetermined time has passed after the power source of the printer is turned on. In step S904, the POD server 110 obtains the status information of an item indicated in "(2) Check every predetermined period" in FIG. 4 from the printer 112, and stores the obtained status information in the RAM 302. There are known methods for receiving the status information such as a method of polling data to the printer 112 from the POD server 110 and a method of transmitting the status information to the POD server 110 from the printer 112. The status information is received at arbitrarily set times or upon requesting the printing from the user or executing the printing.

Referring again to FIG. 8, in step S802, the user who requests the printing service performs an operation to read the original by the scanner 106, or photographs an image by digital camera 109 and through the input terminal group 101, forms an image by the application software on the PC 107, thereby forming image data. Alternatively, the user transmits the image formed by the scanner 106 or the digital camera 109 to the PC 107 and edits or combines the image by the application software on the PC 107, thereby forming the image data. The input terminal group 101 then transmits the above-formed image data to the POD service center 105, and requests the printing of the image data.

In step S803, the POD service center 105 issues on image ID for the image data received in step S802. Then, the POD service center 105 transmits to the input terminal group 101 the image ID and a printing condition setting screen for a user to set a printing condition screen received in step 802 (refer to FIG. 10) to set the printing condition.

In step S804, the user operates the input terminal group 101, and inputs information on the printing condition screen received in step S803 (refer to FIG. 10) to set the printing condition.

The screen for setting the printing condition will be described with reference to FIG. 10. The image ID issued in step S802 has been already input to an image ID field 1000, and is displayed thereon. The user selects or inputs various condition including the number of pages, the number of output copies, the output sheet size, the type of the output sheet, the page layout, color/monochrome printout, the resolution, finishing options, test printing, the output place of the test printing, the output date of the test printing, the output place of the actual printing, and the output date of the actual printing, by operating the input terminal group 101, thereby setting the printing condition. Further, the user inputs the user ID for identifying the user who requested the printing. The user can refer to the individual user information which is stored in the user detailed information 306-1 based on the user ID. In the following description, it is assumed that as the information on the printing condition, the output place of the test printing is the print shop 111, the output place of the actual printing is the print shop 113, the test printing is performed by the printer 112 in the print shop 111, and the actual printing is performed by the printer 114 in the print shop 113.

After inputting the data on the screen for setting the printing condition, a send button 1001 is clicked and, in response, the input terminal group 101 transmits the information for the printing condition input on the screen to the POD service center 105.

In step S805, the POD service center 105 transmits the information on the printing information and the image data received in step S802 to the POD server 110 connected to the printer 112 in the print shop 111 designated as the output place of the test printing based on the information on the printing condition received in step S804. The POD server 110 stores the image ID and the image data to the image memory 306-2. Further, the POD server 110 calculates estimated printing charges for the test printing and the actual printing based on the information on the printing condition and the account table 306-5.

In step S806, the POD server 110 transmits to the input terminal group 101 confirmation information on the printing so as to check whether the calculated printing charge and the printing condition are acceptable to the user. The input terminal group 101 displays the confirmation information on the printing, which is received from the POD server 110, on a screen as shown in FIG. 11. For example, the user can verify the contents of the printing condition and the printing charge utilizing the screen of FIG. 11 on a display of the PC 107 or the portable communication terminal 108.

In step S807, if the printing condition is changed by the user in response to the confirmation information step S806, by for example selecting "NO" in option print 1101 on the screen of FIG. 11, or "YES" in a change of job option 1102, and the information on the charge is transmitted to the POD server 110. The POD server 110 receives the information on the confirmation of the printing indicating that a change of the printing condition is desired and, then, sequentially performs the processing subsequent to step S803.

In step S808, if the printing condition is not changed step S806, the input terminal group 101 selects "YES" by the print option 1101 on the screen 1100 or alternatively "NO" in the change of the printing condition option 1102, and transmits the information to the POD server 110. Incidentally, if "NO" is selected by the print option 1101 on the screen 1100 and "NO" is selected by the change of the printing condition option 1102, the present processing ends.

In step S809, the POD server 110 forms a ticket of a test-printing job and transmits it to the input terminal group 101. The ticket of the test-printing job includes information for identifying the image data or the user who has requested the printing of the user ID, the job ID, the image ID, etc. The user is authenticated to determine whether or not he is the user who has requested the printing in the print shop 111 by printing out the received ticket of the test-printing job by a printer (not shown) in the input terminal group 101 or by displaying it on the display of the portable communication terminal 108.

In step S810, the POD server 110 forms data on the test-printing job based on the information on the printing condition received in step S805 and the image data received in step S805 so as to output the data at the selected output date of the test-printing which is designated based on the information on the printing condition received in step S805. Then, the POD server 110 transmits the formed data on the test-printing job to the printer 112 in the print shop 111 at the output place of the test printing designated based on the information on the printing condition. The printer 112 in the print shop 111 performs the test printing based on the received data on the test-printing job.

When the user is authenticated based on the ticket of the test-printing job, the print shop 111 sends a printing matter on which the designated image data is test-printed, to the user. There are various methods for authenticating the user, such as a method in which a shop assistant in the print shop 111 as an output place verifies the user based on the ticket of the test-printing job which is printed out by the user or is displayed on the display of the portable communication terminal 108, a method in which the user inputs a password included in the ticket of the test-printing job to the printer 112 or a POS terminal (not shown), and a method in which the ticket of the test-printing job is transmitted to the printer 112 or the POD terminal (not shown) from the portable communication terminal 108 and the transmitted ticket is checked.

If the user is dissatisfied with the output result of the test printing and he therefore wants to try a plurality of test printings under different printing conditions, the user sends a notification to the POD service center 105 by using the input terminal group 101. The user can perform the test printing under the different printing conditions by repeating the processing subsequent to step S803 between the POD service center 105, the POD server 110, and the input terminal group 101. One purpose of the test printing is to check the finished printing before performing the actual printing, and, in many cases, a smaller number of copies are test-printed as compared with the actual printing.

In step S811, when the output result of the test printing satisfies the user, he sends a notification indicating the end of the test printing to the POD service center 105 by using the portable communication terminal 108 of the input terminal group 101. The notification may be sent by using a device that communicates with the POD service center 105 such as the printer 112 or the POS terminal (not shown) in the print shop 111, in place of the portable communication terminal 108. When the POD service center 105 receives the notification indicating the end of the test printing, the center 105 sends such a notification to the POD server 110, whereby the POD server 110 calculates the sum of the printing charges of the test printing, and stores the user ID and the calculation result of the charges in the user account information 306-6.

In step S812, the POD service center 105 transmits the image data received in step S802 and the information on the printing condition received in step S804 to the POD server 115 which is connected to the printer 114 in the print shop 113 designated as the output place, of the actual printing, based on the information on the printing condition received in step S804. The POD server 115 stores the image ID and the image data received from the POD service center 105 in the image memory 306-2.

In step S813, the POD server 115 forms the ticket of the actual printing, and transmits the formed ticket to the input terminal group 101. The ticket of the actual-printing job includes information identifying the image data the user who has requested the printing by the user ID, the job ID, and the image ID. The user prints out the received ticket of the actual-printing job by the printer (not shown) in the input terminal group 101 or displays it on the display of the portable communication terminal 108, thereby using the ticket for authenticating whether or not the user has requested the printing in the print shop 113.

In step S814, the POD server 115 forms the data on the actual-printing job based on the information on the printing condition received in step S812 and the image data received in step S812 so as to output the data at the output date of the actual printing designated based on the information on the printing condition received in step S812. Thereby, the formed data on the actual-printing job is transmitted to the printer 114 in the print shop 113 at the output place of the actual printing designated based on the information on the printing information. The printer 114 in the print shop 113 prints out the data based on the received data on the actual-printing job. If the output of the actual printing is not completed normally, the POD server 115 instructs the printer 114 that the printing is to be performed again based on the data on the actual-printing job. In this case, the processing subsequent to step S814 is sequentially executed.

In step S815, when the output of the actual printing is completed normally, the user is authenticated based on the ticket of the actual-printing job and the printing matter to which the actual printing is performed is sent to the user. As stated above, there are methods for authenticating the user, such as a method in which a shop assistant of the print shop 113 checks the user by the ticket of the actual-printing job which is printed or is displayed on the display of the portable communication terminal 108, a method in which a password included in the ticket of the actual-printing job is input to the printer 114 or a POS terminal-(not shown) by the user, and a method for transmitting the ticket of the actual-printing job to the printer 114 or a POS terminal (not shown) from the portable communication terminal 108 so as to authenticate The user sends a notification indicating the end of the actual printing to the POD service center 105 by using the portable communication terminal 108 of the input terminal group 101. The notification may be sent by using a device that communicates with the POD service center 105, such as the printer 114 or the POS terminal (not shown) in the print shop 113, in place of the portable communication terminal 108.

When the POD service center 105 receives the notification indicating the end of the actual printing, the center 105 sends such a notification to the POD server 115, and the POD server 115 stores the user ID and the printing charge of the actual printing in the user account information 306-6. The POD service center 105 requests from the POD server 110 the printing charge of the test printing stored in the user account information 306-6 and the information such as a bank account number and a credit card number of the user which are stored in the user detailed information 306-1, and further requests from the POD server 115 the printing charge of the actual printing stored in the user account information 306-6 and the information such as a bank account number and a credit card number of the user which are stored in the user detailed information 306-1. The POD service center 105 requests from a bank or a credit card company the accounting processing of the printing charge based on the information transmitted from the POD servers 110 and 115. The printing charges for the test printing and the actual printing may be accounted in a lump or separately. In the case of separately accounting the printing charges of the test printing and the actual printing, the printing charge of the test printing may be accounted for after ending the processing in step S811. Alternatively, the accounting processing may be performed in a lump every predetermined period (for example, every month) or every end of the printing.

Further, different users may pay the printing charges for the test printing and the actual printing. In this case, the user inputs and sets the user ID of the test printing user and the user ID of the actual printing user on the screen for setting the printing condition, which is transmitted in step S803, and the accounting processing is performed based on the input user IDs.

When sending the printing matter in step S810 or S815, the user may pay the printing charge by cash or a prepaid card, in a coin case attached to the printer 112 or 114, or a register in the print shop 111 or 113. In this case, not only is the user authenticated based on the presentation of the ticket of the printing job, but also the printing matter may be sent to the user depending on the payment the printing charge.

As mentioned above, the user can check the finishing of the printing by test printing at a neighborhood convenience store or the like without going to a far away print shop for the actual printing a large number of copies by designating the different output places of the test printing and the actual printing.

Second Embodiment

A detail description will be given of the printing with an advertisement upon the test printing in the printing service system according to a second embodiment of the present invention.

Figure 12:
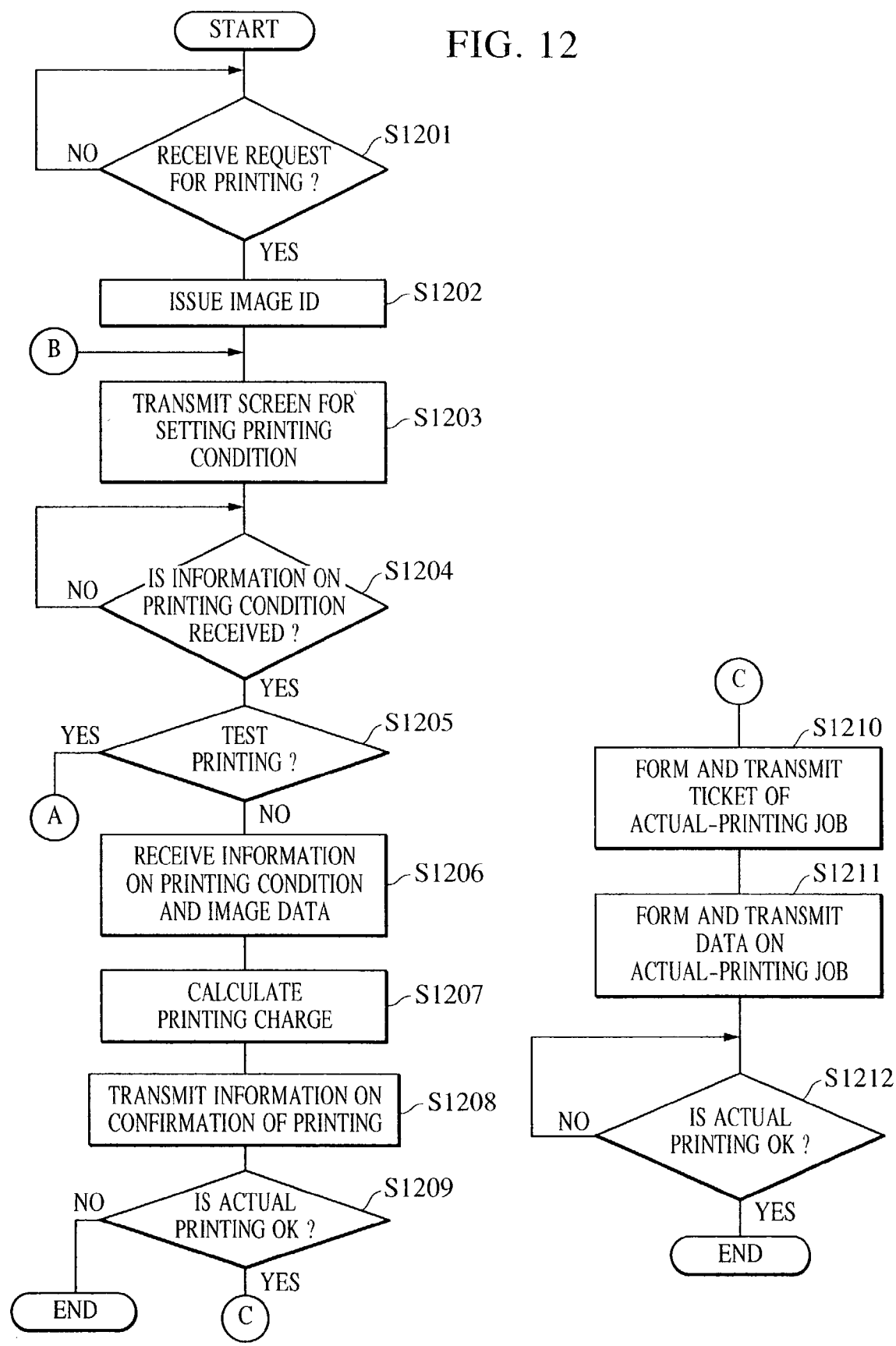
FIG. 12 is a flowchart for explaining the operation of a POD service center and the POD server.

The operation sequence of the POD service center 105 and the POD servers 110 and 115 will be described according to the second embodiment with reference to FIG. 12. In step S1201, the POD service center 105 receives image data from the input terminal group 101 and checks whether or not a request for printing the received image data is received. In step S1202, the POD service center 105 issues an image ID for the image data received in step S1201. In step S1203, the POD service center 105 transmits to the input terminal group 101 the image ID and a screen (refer to FIG. 10) for setting the printing condition in order for a user to set the printing condition of the image data received in step S1201. The user operates the input terminal group 101 and inputs the printing condition in accordance with the received screen to set the printing condition, thereby generating the information on the printing condition. Hereinbelow, a description is given of the case in which, with respect to the information on the printing condition, the test printing is performed by the printer 112 in the print shop 111 connected to the POD server 110 and the actual printing is performed by the printer 114 in the print shop 113 connected to the POD server 115.

In step S1204, the POD service center 105 checks whether or not the information on the printing condition is received from the input terminal group 101. In step S1205, the POD service center 105 checks whether or not the test printing is to be performed based on the information on the printing condition received in step S1204. If it is determined that the test printing is not to be performed, the processing routine advances to step S1206. If it is determined that the test printing is to be performed, the processing routine advances to step S1301 in FIG. 13.

A description will be given of the operation of the POD service center 105 and the POD server 115 when it is determined in step S1205 that the test printing is not to be performed.

In step S1206, the POD server 115 receives the information on the printing condition received in step S1204, the image data received in step S1201, and the image ID issued in step S1202 by the POD server 105. The POD server 115 is connected to the print shop 113, which is designated as the output place of the actual printing based on the information on the printing condition received in step S1204 by the POD service center 105. The POD server 115 stores the image ID, the image data, and the information on the printing condition in the image memory 306-2.

In step S1207, the POD server 115 calculates the estimated printing charge for the actual printing based on the information on the printing condition and the table in FIG. 7 stored in the account table 306-5.

In step S1208, the POD server 115 transmits confirmation information on the printing to the input terminal group 101 so as to confirm whether the printing charge calculated in step S1207 and the printing condition are acceptable to the user. The input terminal group 101 displays the received confirmation information of the printing on the display of the PC 107 or of the portable communication terminal 108. The user can then check the printing condition of the actual printing and the printing charge in accordance with the display contents.

In step S1209, the POD server 115 checks to see if the permission for the actual printing is received from the input terminal group 101. If the permission for the actual printing is not received, the present processing ends. If the permission for the actual printing is received, the processing subsequent to step S1213, which will be described later, is executed.

Next, a description will be given for the operation sequence of the POD service center 105 and the POD server 110 when it is determined in step S1205 that the test printing is to be performed, with reference to the flowchart of FIG. 13.

In step S1301, information on the printing condition, the image data, and the image ID, are received from the POD service center 105 by the POD server 110 connected to the printer 112 in the print shop 111, which is designated as the output place of the test printing based on the information on the printing condition received in step S1204. In step S1302, the POD server 110 stores the image ID, the image data, and the information on the printing condition, which are received in step S1301 in the image memory 306-2.

In step S1303, the POD server 110 checks to see if an advertisement is to be printed upon the test printing by referring to the information on the printing condition received in step S1302. If it is determined in step S1303 that the advertisement is not to be printed, the processing routine advances to step S1307. If the determination is positive in step S1303, flow proceeds to step S1304.

In step S1304, the POD server 110 detects a margin of the printing sheet when printing the image data stored in the image memory 306-2 in step S1302, and checks to see if there is enough of a margin to insert the advertisement. If it is determined in step S1304 that there is not sufficient margin, the processing routine advances to step S1307. In step S1305, the POD server 110 calls advertisement data which matches an area of the margin detected in step S1304 from the advertisement image file 306-6. In step S1306, the POD server 110 inserts and combines to the margin of the printing sheet when printing the image data, the advertisement data called from the advertisement image file 306-6 in step S1305, and forms image data with the advertisement.

In step S1307, the POD server 110 calculates estimated printing charges for the test printing and the actual printing based on the table in FIG. 7 stored in the account table 306-5 and the account table in FIG. 6 of the advertisement data. Of course, if it is determined in step S1303 that the advertisement is not to be printed, the estimation of the printing charges may be calculated based on only the table in FIG. 7 stored in the account table 3065, and not by referring to the account table in FIG. 6 of the advertisement data.

In step S1308, the POD server 110 transmits the information on confirmation of the printing to the input terminal group 101 so as to check whether the printing charge calculated in step S1307 and the printing condition are acceptable to the user. Then, the input terminal group 101 displays the received confirmation information of the printing on the display of the PC 107 or of the portable communication terminal 108, and the user checks the advertisement contents, the printing condition, and the charge for the test printing in accordance with the display contents.

In step S1309, the POD server 110 checks to see if the permission for the test printing is received from the input terminal group 101. It is determined that "the change of the printing condition" is received from the input terminal group 101 and no permission for the test printing is received, the POD server 110 executes the processing subsequent to step S1203 in FIG. 12.

In step S1310, the POD server 110 forms the ticket of the test-printing job and transmits the formed ticket to the input terminal group 101.

In step S1311, the POD server 110 forms data on the test-printing job based on the image data with the advertisement formed in step S1306 and the information on the printing condition received in step S1301 so as to print the data at the output of the test printing based on the information on the printing condition in step S1301. Further, the POD server 110 transmits the formed data on the test-printing job to the printer 112 in the print shop 111 at the output place of the test printing designated based on the information on the printing condition. When the test printing is performed without advertisement, the data on the test-printing job is formed based on the image data received in step S1301, and not based on the image data with the advertisement.

In step S1312, the POD server 110 checks for notification indicating that the output result of the test printing satisfies the user. The user sends the notification by using a device that communicates with the portable communication terminal 108 in the input terminal group 101, the printer 112 in the print shop 111, or the POD server 110 such as a POS terminal (not shown). When the output result of the test printing does not satisfy the user, the processing subsequent to step S1203 in FIG. 12 is sequentially performed again and the processing of the test printing is repeated.

In step S1313, the POD server 110 calculates the sum of the printing charge for the test printing, and stores the user ID and the calculated sum in the user account information 306-6. Further, an advertisement insertion charge for a provider of the advertisement data is calculated. The advertisement insertion charge is sent to the advertisement provider at completion of the test printing or the advertisement insertion charge accumulated for a predetermined period is sent in a lump sum.

In step S1314, the POD service center 105 transmits the information on the printing condition and the image data received in step S1301 to the POD server 115.

Next, a description will be given of the operation processing of the POD service center 105 and the POD server 115 upon the actual printing with reference to FIG. 12.

In step S1210, the POD server 115 forms the ticket of the actual-printing job based on the information on the printing condition received in step S1206 or step S1301 and transmits the formed ticket to the input terminal group 101. In step S1211, the POD server 115 forms the data on the actual-print job based on the information on the printing condition and the image data stored in the image memory 3062 in step S1206 or S1302 so as to print the data at the output of the actual printing designated based on the information on the printing condition. The POD server 115 transmits the formed data on the actual-printing job to the printer 114 in the print shop 113 at the output place of the actual printing designated based on the information on the printing condition. The printer 114 in the print shop 113 prints the data based on the received data on the actual-printing job.

In step S1212, it is checked to see if the output of the actual printing completed normally. If the output of the actual printing does not complete normally, the POD server 115 instructs the printer 114 to perform the printing based on the data on the actual-printing job again. If the output of the actual printing completes normally, in the print shop 113, the user is authenticated based on the ticket of the actual-printing job and the printing matter of the actual printing is sent to the user. As stated above, there are methods for authenticating the user, such as a method in which a shop assistant of the print shop 113 checks the ticket of the actual-printing job which is printed out or is displayed on the display of the portable communication terminal 108 by the user so as to check the user, a method in which a password included in the ticket of the actual-printing job is input to the printer 114 or a POS terminal (not shown) by the user, and a method for transmitting the ticket of the actual-printing job to the printer 114 or a POS terminal (not shown) from the portable communication terminal 108 so as to check the user.

The POD service center 105, which has received the notification of the end of the actual printing from the input terminal group 101, sends such a notification to the POD server 115, and the POD server 115 stores the user ID and the printing charge for the actual printing to the user account information 306-6. Then, the POD service center 105 requests from the POD server 110, the printing charge for the test printing stored in the user account information 306-6, and the information such as user's bank account number and credit card number stored in the user detailed information 306-1, and further requests from the POD server 115, the charge for the actual printing stored in the user account information 306-6 and the information such as user's bank account number and credit card number stored in the user detailed information 306-1. The POD service center 105 requests processing for accounting of the printing charges to a bank or a credit card company based on the information transmitted from the POD servers 110 and 115. When the test printing is not performed, the check for the printing charge for the test printing is not performed for the POD server 110.

As mentioned above, according to the second embodiment, the advertisement is inserted in a margin of the printing sheet and is printed, and the advertisement insertion charge is collected from the advertisement provider. Consequently, the user can execute the test printing with a low charge obtained by subtracting the advertisement insertion charge from the normal printing charge for the test printing. According to the second embodiment, when it is determined, as the result of detecting the margin of the printing sheet, that there is not enough margin, the advertisement is not printed. However, the advertisement image may appropriately be changed by trimming or reducing the size or form thereof based on the result of detecting the margin. Further, in the case of the advertisement printed on the margin, the same advertisement may repeatedly be printed on each page for the test printing or a different advertisement may be printed on each page for the test printing. When the same advertisement is repeatedly printed on each page for the test printing, the printing position and the layout of the advertisement image may be changed every page. In the above case, the change may be reflected in the printing charge.

Third Embodiment

According to a third embodiment, a description will be given of a case of printing the data with the advertisement suitable to the user upon the test printing in the printing service system. A description will be given of the operation of the POD service center 105 and the POD server 110 according to the third embodiment with reference to FIG. 13.

Figure 13:
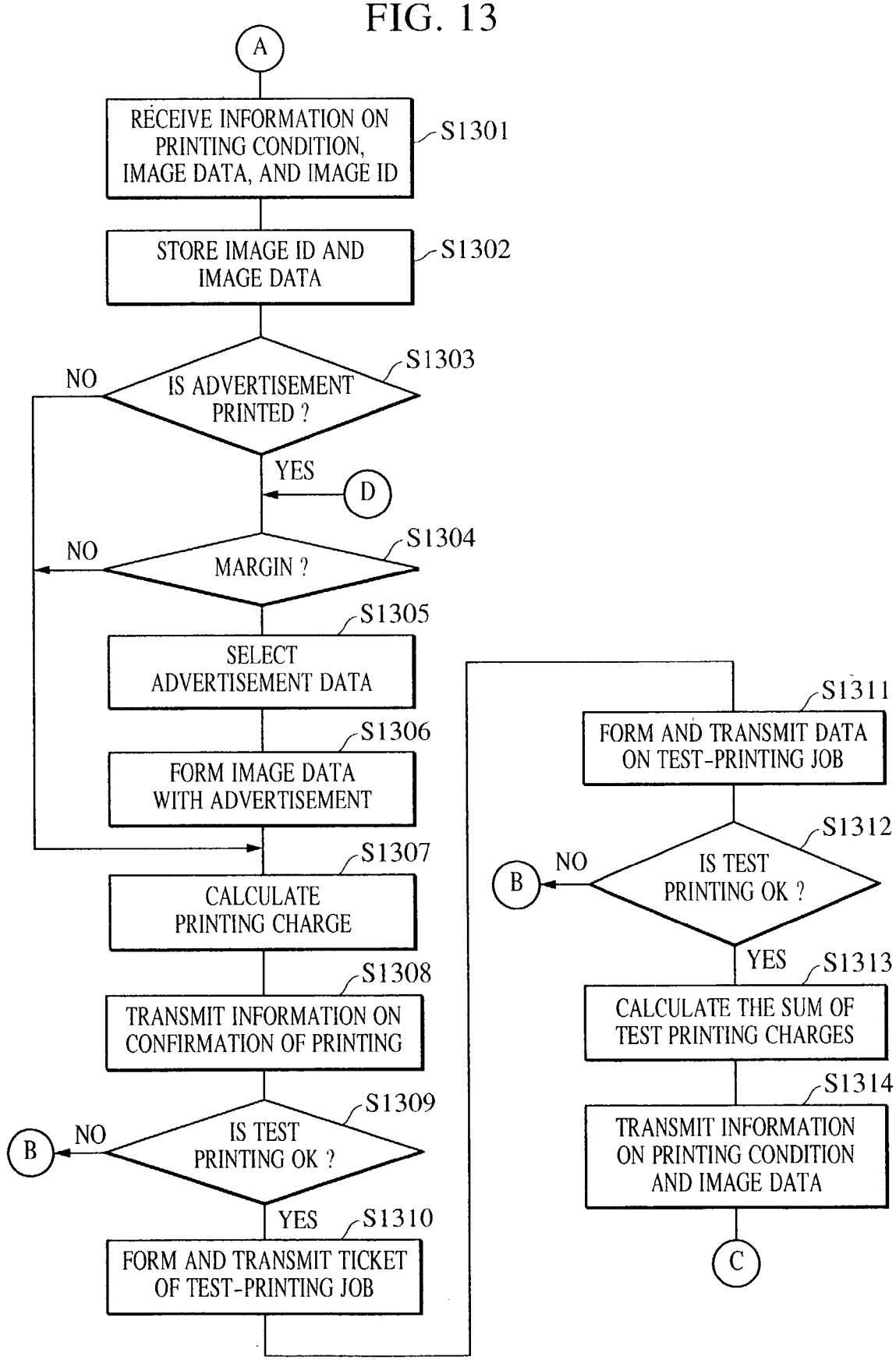
FIG. 13 is a flowchart for explaining the operation of the POD server.

The processing from steps 1301 to 1303 in FIG. 13 are sequentially performed as described above. The POD server 110 determines that the advertisement is to be printed upon the test printing and, then, the POD server 110 sequentially executes the processing in steps S1304 and S1305. According to the third embodiment, in step S1305, the POD server 110 first calls user individual information (such as an address, telephone number, age, and sex) from the user detailed information 306-1 based on the user ID on the information on the printing condition received in step S1301, and specifies a category of a user who has requested the printing. For example, an area is specified or a customer is specified based on the age or the sex. The area may be specified based on the output place of the test printing or the output place of the actual printing which is designated based on the information on the printing condition, not based on the user address.

The POD server 110 selects the advertisement data belonging to the specified category. Thus, the advertisement of a shop near the user can be printed based on the user address information. In the case of selecting the advertisement data, a margin area of the printing sheet detected in step S1304 is considered.

A user's favorite advertisement also be manually selected. In this case, a UI (User Interface) indicating the contents of the account table of the advertisement data shown in FIG. 6 is displayed on the display of the input terminal group 101 and the user selects the favorite advertisement contents while viewing the display contents. The processing subsequent to step S1306 in FIG. 13 will then be sequentially executed.

As mentioned above, according to the third embodiment, in the case of the test printing, the advertisement suitable to the user is selected and is printed in a margin of the printing sheet. Consequently, the advertisement provider can effectively present the advertisement, and the user can obtain the advertisement corresponding to his need.

Fourth Embodiment

A description will be given of a case where an advertisement is printed on the rear surface of a sheet in advance upon the test printing in the printing service system according to a fourth embodiment of the present invention.

Figure 14:
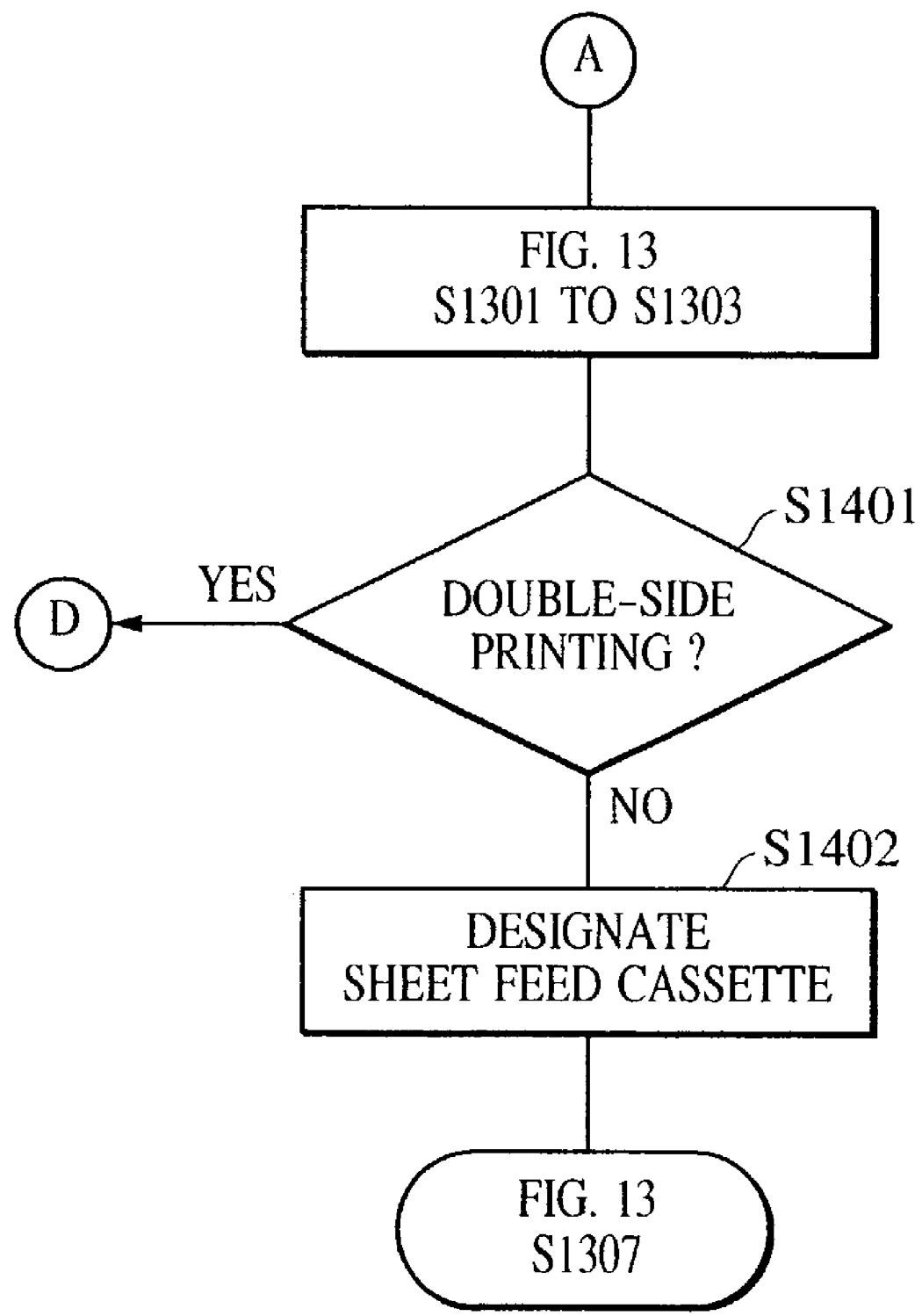
FIG. 14 is a flowchart for explaining the operation of the POD server.

A plurality of sheet feed cassettes are provided for the printer 112 according to the fourth embodiment. A sheet on which the advertisement is printed on the back in advance is set to at least a first cassette. The operation sequence of the POD server 110 will be described according to the fourth embodiment with reference to FIGS. 13 and 14.

The POS server 110 sequentially performs the processing from steps S1301 to S1303 in FIG. 13 as described above. If it is determined in step S1303 that an advertisement is to be printed upon the test printing, the processing routine advances to step S1401 in FIG. 14. In step S1401, it is determined whether the page layout is set as double-sided printing based on the information on the printing condition received in step S1301 in FIG. 13. If the page layout is determined as being set to double-sided printing, the processing subsequent to step S1304 in FIG. 13 will be sequentially performed. In step S1402, if the page layout is not set as double-sided printing in step S1401, a sheet feed cassette is scheduled for a sheet having an advertisement printed on the back based on the information on the printing information is determined. Herein, a plurality of types of printing sheets, on the back of which the advertisement is printed in advance, are prepared and are set to different sheet feed cassettes. Then, a user category is specified, similar to step S1305 in FIG. 13 according to the third embodiment. The sheet feed cassette may be determined based on the category. Thus, the advertisement suitable to the user can be presented.

The processing subsequent to step S1307 in FIG. 13 is then sequentially executed. An advertisement charge is set for each sheet on which the advertisement is printed. According to the fourth embodiment, in step 1307, the POD server 110 calculates the test printing charge based on the advertisement charge on the sheet used for the test printing.

According to the fourth embodiment, in step S1311, the POD server 110 forms the data on the printing job based on the image data and the information on the print condition including information on the printing sheet designated in step 1402, and transmits the formed data on the test-printing job to the printer 112. The printer 112, which has received the data on the test-printing job from the POD server 110 executes the test printing on the designated sheet. As mentioned above, according to the fourth embodiment, the test printing is performed on the sheet on which the advertisement has already been printed on the rear side. Thus, when performing the test printing in the single printing, the advertisement can be printed irrespective of the margin of the printing sheet.

For view of the foregoing embodiments, the objects of the present invention can be accomplished by supplying, to the system or apparatus, a storage medium for storing software program code to implement the functions of the information processing apparatus and the image output device according to the first to fourth embodiments, and by reading out and executing the program code which is stored in the storage medium by a computer (CPU or MPU) of the system or apparatus. In this case, the program code itself, which is read out from the storage medium, implements the functions of the foregoing embodiments and the storage medium which stores the program code constructs the present invention. As for the storage medium to supply the program code, it is able to use a floppy disk, hard disk, optical disk, magneto-optical disk, CD-ROM, CD-R, magnetic tape, nonvolatile memory card, ROM, and the like.

The functions of the aforementioned embodiments can be effected not only by executing the program code, which is read out by the computer, but also by executing a part or all of the actual processes by the OS (Operating System) which operates on the computer on the basis of the instruction of the program code.

The functions of the aforementioned embodiments can further be effected by writing the program code read-out from the storage medium into a memory provided for a function expansion board inserted to the computer or a function expansion unit connected to the computer, and thereafter executing a part or all of the actual processes by a CPU, etc. provided for the function expansion board or function expansion unit on the basis of the instruction of the program code.

As mentioned above, in the present invention, the user can perform the test printing and can check the finishing of the printing at a conveniently located shop without going to a far away print shop having appropriate equipment for performing the actual printing and being capable of printing a numerous number of copies.

Further, in the present invention, the user can perform the test printing inexpensively by subtracting the advertisement charge for the test printing of an advertisement from the ordinal charge for the test printing.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printing system for executing print processing based on image data and printing conditions thereof, comprising:
   a service center comprising:
   first receiving means for receiving a printing request from a user terminal;
   first transmitting means for transmitting printing condition information to the user terminal for inputting of printing conditions;
   second receiving means for receiving, from the user terminal, the input printing conditions;
   second transmitting means for transmitting confirmation information to the user terminal for confirmation of the input printing conditions; and
   communicating means for receiving confirmation of the printing conditions from the user terminal, and in response thereto, transmitting image data and the printing conditions to a print provider;
   said print provider comprising:
   obtaining means for obtaining the image data and the printing conditions thereof;
   combining means for creating combined image data by combining additional data to the image data;
   first creating means for creating first print job data based on the combined image data;
   second creating means for creating second print job data based on the image data without the additional data; and
   print controlling means for controlling a first print processing apparatus to perform print processing of the first print job based on the printing conditions, and thereafter, controlling a second print processing apparatus to perform print processing of the second print job based on the printing conditions.

2. A system according to claim 1, wherein said first print processing apparatus is operated independently of said second print processing apparatus.

3. A system according to claim 1, wherein said printing conditions include at least one of information on an output sheet size, a type of output sheet, a page layout, a color/monochrome print, a print resolution, binding, designation of said first print processing apparatus, an output date of said designated first print processing apparatus, designation of said second print processing apparatus, and an output date of said designated second print processing apparatus.

4. A system according to claim 1, said print provider further comprising:
   detecting means for detecting combined image data by detecting an area of a margin of an output medium on which the image data is to be output,
   wherein said combining means combines said additional data to the image data in accordance with the area of the margin of the output medium, which is detected by the detecting means.

5. A system according to claim 1, said print provider further comprising:
   user information storing means for storing user information which designates the printing conditions,
   wherein the combining means combines to the image data and the additional data, which is selected from a plurality of pieces of the additional data in accordance with the user information stored in the user information storing means.

6. A system according to claim 1, wherein a charge for the output of the first print job data by the first print processing apparatus is calculated based on the additional data which is combined to the image data by said combining means.

7. A system according to claim 1, wherein the additional data is advertisement data.

8. An information processing apparatus, which communicates with an external print processing apparatus via a network, comprising:
obtaining means for obtaining image data and printing conditions thereof from a service center;
combining means for creating combined image data by combining additional data to the image data;
first creating means for creating first print job data based on the combined image data;
second creating means for creating second print job data based on the image data without the additional data; and
print controlling means for controlling a first print processing apparatus to perform print processing of the first print job and thereafter, controlling a second print processing apparatus to perform print processing of the second print job,
wherein said service center comprises (a) receiving means for receiving a printing request from a user terminal, (b) transmitting means for transmitting, in response to the received printing request, printing condition information to the user terminal for inputting of printing conditions, (c) receiving means for receiving, from the user terminal, the input printing conditions, (d) transmitting means for transmitting confirmation information to the user terminal for confirmation of the printing conditions, (e) receiving means for receiving confirmation of the printing conditions from the user terminal, and (f) transmitting means for transmitting, in response to receiving the confirmation, print data and the printing conditions to said print provider.

9. An apparatus according to claim 8, wherein said first print job data is output by the first print processing apparatus, and
said second print job data is output by the second print processing apparatus which is different from said first print processing apparatus.

10. An apparatus according to claim 8, wherein said printing conditions include at least one of information on an output sheet size, a type of output sheet, a page layout, a color/monochrome print, a print resolution, binding, designation of said first print processing apparatus for outputting said first print job data, an output date of said designated first print processing apparatus, designation of said second print processing apparatus for outputting said second print job data, and an output date of said designated second print processing apparatus.

11. An apparatus according to claim 8, wherein said combined image data is formed by combining said image data and said additional data, which is selected in accordance with an area of a margin of an output medium on which said image data is to be output.

12. An apparatus according to claim 8, wherein said combined image data is formed by combining said image data and the additional data, which is selected in accordance with user information which designates said printing conditions.

13. An apparatus according to claim 8, wherein a charge for the output of said first print job data by the first print processing apparatus is calculated based on the additional data which is combined to said image data.

14. A method of printing over a network, comprising the steps of:
a service center receiving a printing request from a user terminal;
the service center transmitting printing condition information to the user terminal for inputting of printing conditions;
the service center receiving, from the user terminal, the input printing conditions;
the service center transmitting confirmation information to the user terminal for confirmation of the input printing conditions;
the service center receiving confirmation of the printing conditions from the user terminal, and in response thereto, transmitting print data and the printing conditions to a print provider;
the print provider creating combined print data by combining the print data and additional data;
the print provider creating first print job data based on the combined print data;
the print provider creating second print job data based on the print data without the additional data; and
the print provider controlling a first print processing apparatus to print the first print job data based on the printing conditions, and thereafter, controlling a second print processing apparatus to print the second print job data based on the printing conditions.

15. A method according to claim 14, wherein the printing request received by the service center comprises the print data.

16. A method according to claim 14, wherein the printing conditions comprise performing printing of a test job.

17. A method according to claim 14, wherein the network is the Internet.

18. A method according to claim 14, wherein the service center and the printing provider are one in the same.

19. A server terminal for a printing service provider, comprising:
a processor that executes computer-executable process steps; and
a memory that stores the computer-executable process steps, wherein the computer-executable process steps comprise the steps of (a) receiving a printing request from a user terminal, (b) in response to the received printing request, transmitting printing condition information to the user terminal for inputting of printing conditions, (c) receiving, from the user terminal, the input printing conditions, (d) transmitting confirmation information to the user terminal for confirmation of the printing conditions, (e) receiving confirmation of the printing conditions from the user terminal, (f) in response to receiving the confirmation, transmitting print data, and the printing conditions to a print provider,
wherein the print provider comprises a processor that executes computer-executable process steps and a memory that stores the computer-executable process steps, wherein the computer-executable process steps comprise the steps of (g) creating combined print data by combining the print data and additional data, (h) creating first print job data based on the combined print data, (i) creating second print job data based on the print data without the additional data, (j) controlling a first print processing apparatus to perform print processing of the first print job based on the printing conditions, and thereafter, controlling a second processing apparatus to perform print processing to the second print job based on the printing conditions.

20. A computer-readable storage medium on which is stored computer-executable process steps for printing over a network, comprising the steps of:

a service center receiving a printing request from a user terminal;

the service center transmitting printing condition information to the user terminal for inputting of printing conditions;

the service center receiving, from the user terminal, the input printing conditions;

the service center transmitting confirmation information to the user terminal for confirmation of the printing conditions;

the service center receiving confirmation of the input printing conditions from the user terminal, and in response thereto, transmitting print data and the printing conditions to a print provider;

the print provider creating combined print data by combining the print data and additional data;

the print provider creating first print job data based on the combined print data;

the print provider creating second print job data based on the print data without the additional data; and the print provider controlling a first print processing apparatus to print the first print job data based on the printing conditions, and thereafter, controlling a second print processing apparatus to print the second print job data based on the printing conditions.

\* \* \* \* \*

UNITED STATES PATENT AND TRADEMARK OFFICE
CERTIFICATE OF CORRECTION

PATENT NO. : 7,280,237 B2
APPLICATION NO. : 10/173590
DATED : October 9, 2007
INVENTOR(S) : Komiya It is certified that error appears in the above-identified patent and that said Letters Patent is hereby corrected as shown below:

DRAWINGS:
    Sheet 7, FIG. 7, Row 22 of Table, "TEST" should read -- TEST PRINTING --; and
    Row 26 of Table, "ACTUAL" should read -- ACTUAL PRINTING --.

COLUMN 1:
    Line 58, "is" should read -- is a --.

COLUMN 3:
    Line 44, "party" should read -- party. --; and
    Line 49, "of;" should read -- of: --.

COLUMN 5:
    Line 40, "oh" should read -- on --.

COLUMN 8:
    Line 13, "on" should read -- an --; and
    Line 17, "802" should read -- S802 --.

COLUMN 9:
    Line 13, "changed" should read -- changed in --.

COLUMN 10:
    Line 23, "place," should read -- place --;
    Line 31, "data" should read -- data to --; and
    Line 66, "terminal-(not" should read -- terminal (not --.

COLUMN 11:
    Line 2, "authenticate" should read -- authenticate the user. --;
    Line 50, "payment" should read -- payment of --;
    Line 54, "printing" should read -- printing of --; and
    Line 60, "detail" should read -- detailed --.

COLUMN 13:
    Line 37, "3065," should read -- 306-5, --.

COLUMN 14:
    Line 39, "3062" should read -- 306-2 --.

UNITED STATES PATENT AND TRADEMARK OFFICE
CERTIFICATE OF CORRECTION

PATENT NO. : 7,280,237 B2
APPLICATION NO. : 10/173590
DATED : October 9, 2007
INVENTOR(S) : Komiya It is certified that error appears in the above-identified patent and that said Letters Patent is hereby corrected as shown below:

<u>COLUMN 16</u>:
Line 11, "also" should read -- also can --; and
Line 65, "1307," should read -- S1307, --.

<u>COLUMN 17</u>:
Line 5, "1402," should read -- S1402, --; and
Line 52, "numerous" should be deleted.

Signed and Sealed this

Twenty-eighth Day of October, 2008

JON W. DUDAS
*Director of the United States Patent and Trademark Office*